(12) United States Patent
Rietsch (10) Patent No.: US 6,612,805 B2
(45) Date of Patent: Sep. 2, 2003

(54) HYDRODYNAMIC MACHINE

(75) Inventor: Peter Rietsch, Regnitzlosau (DE)

(73) Assignee: EMU Unterwasserpumpen GmbH, Hof/Saale (DE)

(*) Notice: Subject to any disclaimer, the term of this patent is extended or adjusted under 35 U.S.C. 154(b) by 113 days.

(21) Appl. No.: 09/994,478

(22) Filed: Nov. 27, 2001

(65) Prior Publication Data

US 2002/0071761 A1 Jun. 13, 2002

(30) Foreign Application Priority Data

Dec. 5, 2000 (DE) .......................... 100 60 617
Jan. 27, 2001 (DE) .......................... 101 03 575

(51) Int. Cl.$^7$ ............................................. F04D 29/12
(52) U.S. Cl. .................. 415/113; 415/231; 415/121.2; 415/169.1
(58) Field of Search ................. 415/113, 111, 415/231, 212, 197, 206, 170 R, 196, 201, 204, 121.2, 169.1, 174.2, 174.3, 230

(56) References Cited

U.S. PATENT DOCUMENTS 2,802,679 A * 8/1957 Taltavall, Jr.
3,558,238 A    1/1971 Van Herpt
4,202,654 A * 5/1980 Marlow ...................... 415/113
6,053,500 A    4/2000 Fondelius

FOREIGN PATENT DOCUMENTS

| DE | 1 800 888   | 5/1969  |
| DE | 3 015 211   | 10/1981 |
| EP | 0 252 037   | 4/1990  |
| EP | 0 542 530   | 1/1996  |
| EP | 0 879 977   | 11/1998 |
| GB | 975076      | 2/1963  |
| WO | WO 98/05890 | 1/1998  |

* cited by examiner

Primary Examiner—Edward K. Look
Assistant Examiner—J. M. McAleenan
(74) Attorney, Agent, or Firm—Schweitzer Cornman Gross & Bondell LLP (57) ABSTRACT

A hydrodynamic machine such as an agitator or a pump has a seal at the fluid medium side in the form of a sliding ring in a coaxial opening in the impeller wheel hub. To prevent particle deposits and blockages in the region of the seal the hub engages into a pot-shaped opening in the housing, forming a conical outwardly enlarging annular gap. Formed on the outside of the hub is a spiral means which when the hub rotates produces a fluid flow outwardly of the annular gap to counteract a deposit of contaminating matter such as particles and fibers from the fluid in the annular gap and thus also at the seal.

62 Claims, 3 Drawing Sheets

HYDRODYNAMIC MACHINE

FIELD OF THE INVENTION

The invention concerns generally a machine and more particularly a hydrodynamic machine involving a flow of a fluid medium, for example a pump, an agitator or the like. The invention further concerns a wheel such as an impeller or propeller, preferably for use in a hydrodynamic machine.

BACKGROUND OF THE INVENTION

A typical configuration of a machine such as a hydrodynamic machine such as a pump or agitator comprises a stationary housing with a motor-driven shaft supported in the housing and a wheel on the shaft for moving a fluid medium. The shaft engages through an opening in the housing, and the wheel which is arranged at the free end of the shaft is disposed outside the housing. The hub of the wheel engages into the opening in the housing, forming an annular gap between the inside wall of the opening and the outside wall of the hub. A seal seals off the shaft and/or the hub and the housing relative to the medium and a spiral arrangement is arranged in the region of the hub in fixed relationship therewith to produce a flow of medium which is directed out of the annular gap to prevent particles from being deposited therein.

In this respect, consideration may be given to EP 0 252 037 B1 disclosing a sealing arrangement for an agitator or a pump, which, as indicated above, has in the region of the annular gap between the hub of the wheel and the opening in the housing a spiral arrangement which opposes particle deposit in the gap by virtue of producing a fluid flow which is directed out of same. In that structure the spiral arrangement is of such a configuration that a spiral surface structure is formed in the inside wall of the opening in the housing and the outside wall of the wheel of the hub. The annular gap is in the form of a cylindrical gap between those mutually oppositely disposed concentric walls which in effect are provided respectively with male and female screwthread configurations. When the hub is rotated in the opening in the housing, an outwardly directed flow is generated in the annular gap, and is intended to transport particles outwardly thereof. In addition, provided at the upper edge of the opening in the housing is a cutting device insofar as cutting edges are provided at the annular edge of the opening in the housing and on the wheel hub. When the hub rotates, the cutting edges co-operate with each other and are intended to make the particles as small as possible.

It will be appreciated that this design configuration is relatively complicated and expensive in regard to its structure as it involves machining a plurality of mutually co-operating, especially machined surfaces on each of the co-operating components. Disturbances can occur in operation thereof, particularly if there are relatively large amounts of large-size particles, for on the one hand the operation of reducing the size of the particles means that the amount of material which can involve sedimentation in the annular gap is increased, while on the other hand blockages can occur in the region of the cutting arrangement itself, particularly once a certain amount of wear of the cutting edges has occurred.

Attention may also be directed to U.S. Pat. No 6,053,500 A disclosing a further sealing arrangement for a shaft of a pump impeller. That arrangement has a housing with an opening therein, into which the hub of the impeller engages. Provided in the region of the inside wall of the opening is a screw pitch which is formed in fixed relationship with the housing and operable to counteract particle deposition there. When the hub rotates in the opening in the housing, the result is a flow therein, with which particles are to a certain extent entrained outwardly thereof.

Reference may also be made to EP 0 542 530 B1 disclosing a seal for a shaft, in which the sealing member itself has a spiral structure and thereby, upon rotation of the shaft, a flow which is directed outwardly in the region of the seal is generated. That is intended to oppose deposit of particles to a certain extent.

EP 0 879 977 A2 also involves a further sealing arrangement for a shaft, in which a sealing member comprising polymer material has sealing lips with taper angles of different gradients, which co-operate with the peripheral sealing surface on the shaft. The shaft in that region has grooves extending in a helical configuration, with a groove depth of less than 15 $\mu$m, in order to transport lubricant back into the sealing region in order to lubricate the sealing edges during rotation of the shaft.

SUMMARY OF THE INVENTION

An object of the present invention is to provide a hydrodynamic machine of such a design configuration in the sealing and shaft-supporting area thereof as to counteract deposit of particles in the region of the shaft seal at the medium side in a structurally simple manner with a high level of operational reliability.

A further object of the present invention is to provide a hydrodynamic machine such as a pump or agitator adapted to resist fibrous constituents possibly contained in the medium becoming wrapped around the wheel hub.

Still another object of the invention is to provide a hydrodynamic machine which while being of a simple structure more effectively produces a flow of fluid medium operable to remove particles and other contaminating matter in the fluid medium from the region of a wheel such as an impeller or propeller of the machine.

Yet a further object of the invention is to provide a wheel such as a propeller or impeller for a hydrodynamic machine, which is capable of resisting particle deposit in its bearings and at least in part reducing the likelihood of elongate contaminating material in the fluid medium becoming wrapped around the wheel hub.

In accordance with the principles of the present invention in the machine aspect the foregoing and other objects are attained by a machine such as a hydrodynamic machine, for example a pump, agitator or the like, comprising a stationary housing with a motor-driven shaft which is supported in the housing and which has a preferably non-rotatably connected wheel for moving a fluid medium, more particularly for example an impeller, propeller or the like. The shaft extends coaxially through a pot-shaped opening in the housing and the wheel which is arranged at the free end of the shaft is disposed outside the housing. The hub of the wheel on the shaft engages into the pot-shaped opening in the housing, forming an annular gap between the inside wall of the opening in the housing and the outside wall of the hub. The machine further includes a seal for sealing off the shaft and/or the hub and the housing in relation to the fluid medium, while a spiral arrangement is disposed in the region of the hub non-rotatably with respect thereto to produce a flow of medium which in the annular gap is directed out of same, to prevent particle deposit. The outside diameter and/or the cross-section of the annular gap between the inside wall of the opening in the housing and the outside wall of the wheel hub is or are of a configuration which increases towards the wheel.

Further in accordance with the principles of the invention, in the wheel aspect thereof, the foregoing and other objects are attained by a wheel in the form of an impeller or propeller, preferably for use in a hydrodynamic machine such as a pump or agitator, comprising propeller blades or impeller vanes and a wheel hub, preferably for engagement into a pot-shaped opening in a housing such as a sealing housing of the hydrodynamic machine. The wheel hub is connected in one piece to the propeller blades or impeller vanes and has a spiral arrangement on its outside wall.

In a modified form of that wheel the spiral arrangement extends at the outside of the wheel hub from a position on the wheel hub which is remote from the propeller blades or impeller vanes, preferably from the end of the hub remote from the propeller blades or impeller vanes, to the underside of the propeller blades or impeller vanes.

As will be seen from the description hereinafter of preferred embodiments of the invention, the fact that the annular gap is of an outside diameter or cross-section which increases towards the exit therefrom means that the annular gap is of a conical configuration. That strengthens the flow produced upon rotation of the hub due to the action of the spiral arrangement, in the annular gap, in such a way as to produce a pronounced, outwardly directed preferably spiral flow of fluid medium. Due to the increasing cross-section of the annular gap, the outwardly directed flow is also strengthened and opposes the formation of blockage in the annular gap.

The spiral arrangement is formed non-rotatably with the hub, preferably in the form of raised portions or recesses extending in a spiral configuration on the outside wall of the hub. The spiral raised portions or recesses can extend around the hub in the form of interconnected continuous spirals, but alternatively they can also be formed in a region-wise manner as interrupted spiral portions. In accordance with preferred features of the invention, the spiral-shaped or screw-shaped configurations are formed directly in the outside wall of the hub, thus in effect in the form of spiral-shaped or screw-shaped surface structuring in the form of a male screwthread on the surface of the hub. The inside wall of the opening in the housing, into which that hub engages to afford the annular gap, can have an inside surface which is preferably conical or of a tapered configuration. It is possible but not necessary to forego a spiral arrangement in the region of the inside wall of the opening in the housing, such as to co-operate with the spiral arrangement on the hub, and that elimination of the spiral arrangement in the opening in the housing can afford advantages from the point of view of the manufacturing process involved. It is also possible to eliminate a cutting arrangement in the region of the annular gap for the above-discussed configurations according to the invention produce in the region of the annular gap a particularly strong and effective outwardly directed flow which ensures that even relatively large particles and in particular fibrous material are transported away.

Apart from that consideration, the deposit of particles in the annular gap is also at least substantially prevented by virtue of a particular arrangement and configuration of the seal. For that purpose, in accordance with a further preferred feature of the invention, the wheel hub can have a coaxial opening which is open at the end remote from the wheel and in which at least a part of the seal is arranged. The seal can have a sliding ring which is fixed with respect to the housing and which has a sealing surface at the housing side and which is arranged in the region of a housing aperture through which the shaft passes. As a further component part, the seal may also have a sliding ring which is non-rotatable with respect to the shaft or the hub and which is arranged within the opening of the hub. It can co-operate with an elastic sealing element having a sealing surface on the shaft side and/or the hub side and is also arranged within the opening in the hub. Although in that arrangement the annular gap between the outside wall of the hub and the inside wall of the pot-shaped opening in the housing is provided in the immediate proximity of the seal, it is arranged at a radial and/or axial spacing with respect to the seal, for the annular gap is disposed at the outside of the hub while the seal is arranged substantially within the inner coaxial opening in the hub. That configuration on the one hand therefore prevents the formation of deposits of particles due to the flow in the annular gap while on the other hand, by virtue of the seal being arranged in a protected fashion within the opening in the hub, this arrangement provides that the seal is not accessible for a deposit of particles thereat or does not have fluid medium flowing therearound. Furthermore, the particular configuration set forth above with sliding rings means that the risk of damage to the seal due to possible particle deposits and the like can be reduced. The sliding ring which is fixed with respect to the housing and/or the sliding ring which is fixed with respect to the hub or the shaft can be made from suitable material such as ceramic material, for example silicon carbide. Such a material affords particularly good sliding and sealing properties and affords a particular degree of robustness in relation to damage caused by particle deposits and blockages.

In accordance with a further preferred feature of the invention the opening in the hub can extend from the hub end remote from the wheel, along half or a third of the axial length of the hub. That affords sufficient structural space for the seal.

In another preferred feature of the invention which can afford a particularly strong flow of fluid medium in the annular gap, the spiral arrangement extends at the outside of the wheel hub from the end of the wheel hub which is remote from the wheel, as far as the underside of the wheel or into a position at a preferably small axial spacing from the underside of the wheel. It has been found desirable in terms of producing an effective flow of fluid medium in the annular gap if the spiral arrangement initially extends over the entire axial length of the outer periphery of the hub portion which engages into the pot-shaped opening of the housing and directly forms the annular gap with the inside wall of the opening in the housing. In that case, extending the spiral arrangement on the outside of the hub to the underside of the wheel can increase the effect of transporting the particles away from the region of the exit from the annular gap and can thus serve to obviate blockages in the annular gap. A particularly effective flow can be achieved if the spiral arrangement is adapted to form a transition into the working surfaces of the wheel, preferably the wheel blades or the like.

In accordance with a further preferred feature of the wheel which can be for example in the form of a propeller, the hub of the propeller, in the region where the blades are formed thereon, can involve a thickening in the outside diameter of the hub so that a transitional region is afforded between that region of the hub in which the propeller blades are arranged and the adjoining region of the hub which is remote from the propeller blades. The transitional region can be bevelled, stepped or rounded. The thickening in the outside diameter of the hub is afforded particularly in embodiments of propellers having more than two blades, for example in the case of a three-bladed propeller. It is generally possible to forego the increase in the outside diameter of the hub, when dealing with a propeller having two blades. The increase in the hub outside diameter is at least desirable and may be necessary when dealing with propellers having a plurality of blades, in order to ensure that the locations at which the propeller blades are formed on the hub, for example the roots of the blades, are at the outside periphery of the hub. Particularly for reasons related to manufacture, the thickening in the case of propellers of a relatively large diameter is of a substantially spherical configuration, while in the case of propellers of a smaller diameter the thickening can be in the form of a cylindrical portion.

Further objects, features and advantages of the invention will be apparent from the description hereinafter of preferred embodiments.

DESCRIPTION OF PREFERRED EMBODIMENTS

Figure 1:
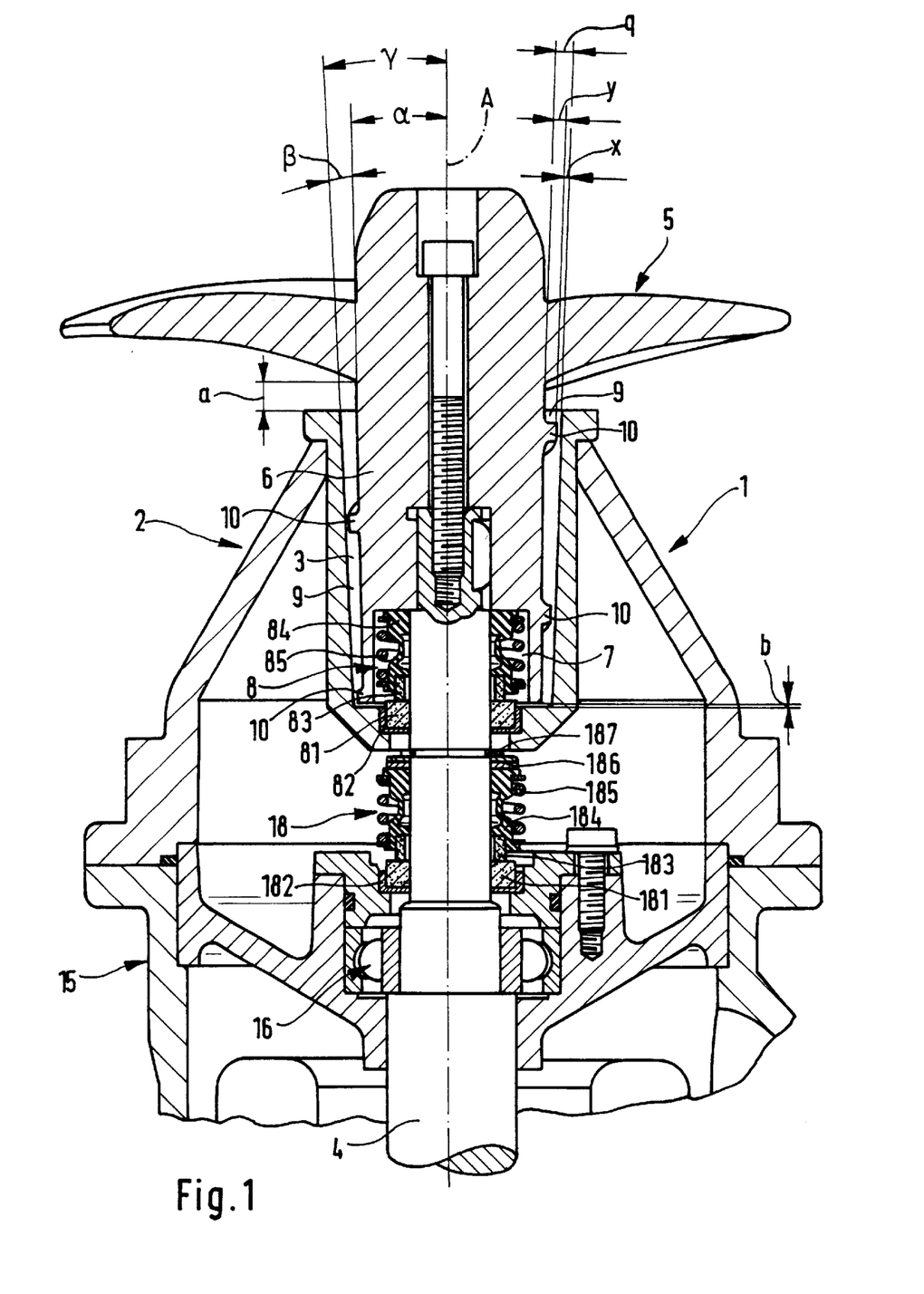
FIG. 1 is a sectional view of an agitator in the region of a propeller and a sealing housing thereof.

Referring firstly to FIG. 1, shown therein is part of an embodiment of the invention in the form of an agitator and more particularly an immersion agitator for use under water, for example in settlement tanks. The agitator has a housing 1 which in use is arranged stationarily under water. FIG. 1 shows the upper portion of the housing 1, in the region of a sealing housing indicated at 2. Provided in the sealing housing 2 is a generally pot-shaped opening 3 in the housing, through which projects a shaft 4 which is driven by a motor coupled thereto at the shaft end which is the lower end in FIG. 1. A wheel illustrated in the form of a propeller 5 is fixedly mounted on the free end of the shaft 4, which projects upwardly out of the sealing housing 2. The propeller 5 has a hub 6 which engages into the opening 3 in the housing. The propeller hub 6 extends in coaxial relationship with the opening 3 in the housing, thereby forming a space in the form of an annular gap between the inside wall of the opening 3 and the outside wall surface of the propeller hub 6.

The underside of the propeller 5, that is to say the lower edge of the propeller blades as viewing in FIG. 1, is arranged at a spacing indicated at a above the upper free edge of the opening 3 in the housing 1. The hub 6 extends on the side remote from the propeller blades into the opening 3 and extends as far as the region of the bottom of the opening 3. In this case, the end of the hub 6, which is remote from the propeller blades, is arranged at a small spacing as indicated at b from the bottom of the opening 3 in the housing.

At its end remote from the propeller blades the hub 6 has a coaxial cylindrical opening 7 forming a generally pot-shaped receiving space into which engages a seal 8 arranged on the shaft 4. The fluid medium, for example water, in which the agitator is disposed and which is moved by the agitator by virtue of being displaced by means of the propeller 5 is in the entire space outside the housing 1 and thus also in the opening 3 in the housing and in the opening 7 in the hub.

The seal 8 forms a sealing arrangement at the fluid medium side between the housing, that is to say more specifically between the sealing housing 2, and the hub 6 and the shaft 4. The seal 8 is in the form of a sliding ring seal arrangement. Thus, it comprises a sliding ring 81 which is arranged in fixed relationship with the housing in an angular sleeve portion 82 arranged in a stepped edge at the bottom of the opening 7 in the hub 6, thereby forming a sealing surface at the housing side. The sliding ring 81 is made from ceramic material such as silicon carbide. It surrounds the shaft 4 but remains fixed with respect to the housing 1 when the shaft 4 rotates, so that the shaft 4 therefore rotates with a sliding movement in the stationary ring 81. The seal further includes a sliding ring 83 which also extends around the shaft 4 and which is non-rotatably connected to the hub 6. The inside diameter of the sliding ring 83 however is markedly larger than the inside diameter of the ring 81 and the outside diameter of the shaft 4. The ring 83 is made of a corresponding material to the ring 81, that is to say for example also ceramic material such as silicon carbide.

As a connecting element the sealing arrangement further includes a rubber bellows member 84 which is mounted on the shaft 4 and which is supported with its one end against the ring 83 and with its other end against the inner surface at the bottom of the opening 7 in the hub 6, thereby forming a sealing surface at the hub side. In this arrangement, the rubber bellows member is axially stressed by a coil spring 85 which is disposed around the rubber bellows member 84 so that the rubber bellows member 84 is pressed with its one end non-rotatably and in sealing relationship against the bottom surface in the opening 7 in the hub 6, while its other end is pressed axially against the ring 83.

The hub 6 is of such a configuration that it tapers towards its end that is remote from the blades of the propeller 5, so that the outside of the hub 6, that is to say the outside wall thereof, is of a substantially conical or tapering configuration. The inside wall of the pot-shaped opening 3 in the housing is also of a conical or tapering configuration.

The annular gap 9 which is formed between the outside of the hub 6 and the inside wall surface of the opening 3 in the housing increases in width towards the exit end thereof, which is the upper end in FIG. 1. Both the outside diameter of the annular gap and also the inside diameter thereof increase in an outward direction, over the extent of the annular gap 9. In that respect, the outside diameter increases to a greater extent than the inside diameter. The respective increase is regular and preferably constant over the extent of the annular gap 9 from the inside outwardly, so that the cross-section of the annular gap therefore increases continuously in the axial direction from the inside outwardly.

Referring still to FIG. 1, the cone or taper angle of the hub 6 is indicated by $\alpha$, the cone or taper angle of the pot-shaped opening 3 in the housing is denoted by $\gamma$ while the cone or taper angle of the conical enlargement of the annular gap 9 is indicated at $\beta$. The angle $\alpha$ is the angle formed by the center line A of the hub 6 with the outside wall of the hub 6, with the limbs defining the angle $\alpha$ being in a section plane in which the center line A is disposed. In the embodiment illustrated in FIG. 1 the angle $\alpha$ is 1°. The angle $\gamma$ is the angle formed by the center line of the opening 3 in the housing, which is aligned with the center line A of the hub 6, with the inside wall surface of the opening 3 in the housing, with the limbs of the angle $\gamma$ being in a section plane in which the center line A is disposed. In the embodiment illustrated in FIG. 1 the angle $\gamma$ is 2°. The angle $\beta$ is the angle of the conical enlargement of the annular gap 9, with the angle being formed between the outside wall of the hub 6 and the inside wall of the opening 3 in the housing. The limbs of the angle $\beta$ are in a section plane in which the center line A is disposed. In the illustrated embodiment of FIG. 1 the angle is 2°.

It will be appreciated that in other modified embodiments which basically involve the same structural configuration as the embodiment shown in FIG. 1, the values α, γ and β may be of different values. The angle α can be of a value which is in the range of between 0.5° and 10°. The angle γ can be of a value which is in the range of between 1° and 13° while the angle β can be of a value which is in the range of between 0.5° and 3°.

Provided on the conical outside wall of the hub 6 is a spiral arrangement including a spiral-shaped raised portion diagrammatically indicated at 10 which, extending around the hub 6 in a spiral or screwthread-like configuration, extends from the end of the hub 6 remote from the blades of the propeller 5, to the underside of the propeller 5 which is the lower end thereof in FIG. 1. The raised portion 10 extending in a spiral configuration around the outer peripheral surface of the hub 6 is in the form of a raised portion of substantially rectangular cross-section, being therefore in projecting relationship from the outside wall of the hub 6. The radial height y of the raised portion 10 increases as it extends towards the blades of the propeller 5 so that a substantially constant gap of a radial width as indicated at x is formed between the radial outward side of the raised portion 10 and the inside wall of the opening 3 in the housing.

In comparison, as already indicated above, the cross-sectional width q of the annular gap between the outside wall of the hub 6 and the inside wall of the opening 3 in the housing, with the angle β, increases in an axial direction outwardly because the inside wall of the opening 3 is more steeply conical than the conicity of the outside wall of the hub 6. The conicity of the spiral portion 10 is equal to that of the inside wall of the pot-shaped opening 3 in the housing, that is to say in each case with the cone angle γ, so that in the region of the spiral portion the respective internal gap width x relative to the inside wall of the opening 3 is constant, as already indicated hereinbefore.

In the embodiment illustrated in FIG. 1 the cross-sectional width q of the annular gap 9 is 3.5 mm at its exit end. The radial height y of the spiral portion 10 is at least 3 mm, at its exit end, that is to say in the region of the exit opening of the annular gap 9. In the region of the annular gap 9 which is towards the bottom, the radial height y is correspondingly less. The spacing x is constant over the entire axial length of the annular gap 9 and is 0.5 mm at a maximum.

In modified embodiments which basically involve the same structural configuration as the embodiment in FIG. 1, the spacing x can be in a range of between 0.2 mm and 3 mm, more specifically preferably constant with a selected value in that range. The radial height y of the spiral configuration 10 can be in the range of between 2 mm and 10 mm. It is preferably provided also in these modified embodiments that the radial height y increases towards the blades of the propeller 5, that is to say it is of its maximum size in the region in the proximity of the propeller blades. In these modified embodiments also the cross-sectional width q of the annular gap 9 can be in a range of between 2.2 mm and 13 mm. These modified embodiments can also provide that the cross-sectional width q of the annular gap 9 is preferably not constant over the axial extent of the gap, but the cross-sectional width q increases towards the propeller blades, that is to say towards the exit opening of the gap, thereby forming the angle β.

The spiral configuration 10 in conjunction with the annular gap 9 forms a flow-guide means which, upon rotation of the propeller 5 with the hub 6, generates in the pot-shaped opening 3 in the housing a fluid medium flow which is directed away from the seal 8 and which can oppose deposit of particles in the fluid medium in the region of the seal or in the region of the bottom of the opening 3. In other words, the hub with the spiral configuration 10, as it rotates in the gap 6, produces a conveying effect operating on the basis of the principle of a screw pump, for conveying the fluid medium together with any contaminating material, particles or fibrous material therein, out of the annular gap 9.

The shaft 4 is drivingly connected to the above-mentioned electric motor, possibly by way of a suitable interposed transmission unit. In this respect, the shaft 4 can also be formed directly as the motor drive output shaft. The motor is suitably supported in the housing in a portion thereof which constitutes a motor housing as indicated at 15. The upper part of the motor housing 15 is shown in FIG. 1. Supported in the motor housing 15 is a rotary bearing assembly 16 in which the shaft 4 passing through the bearing assembly 16 is rotatably supported. A sliding ring seal 18 is provided to seal off the shaft 4 between the motor housing 15 and the remainder of the housing configuration, that is to say the actual sealing housing 2. The sliding ring seal 18 is of the same design configuration as the sliding ring seal 8 as described hereinbefore. It has a ceramic sliding ring 181 arranged non-rotatably with the motor housing 15 by way of an angle sleeve portion 182, and a ceramic sliding ring 183 which is non-rotatable with the shaft 4 and which is acted upon by way of a rubber bellows member 184 non-rotatable with respect to the shaft 4, by way of a coil spring 185 which is disposed around the rubber bellows member 184. The rubber bellows member 184 with the coil spring 185 bears axially against two annular disks 186 which in turn are axially supported against a spring ring or circlip 188 accommodated in a radial groove 187.

Figure 2:
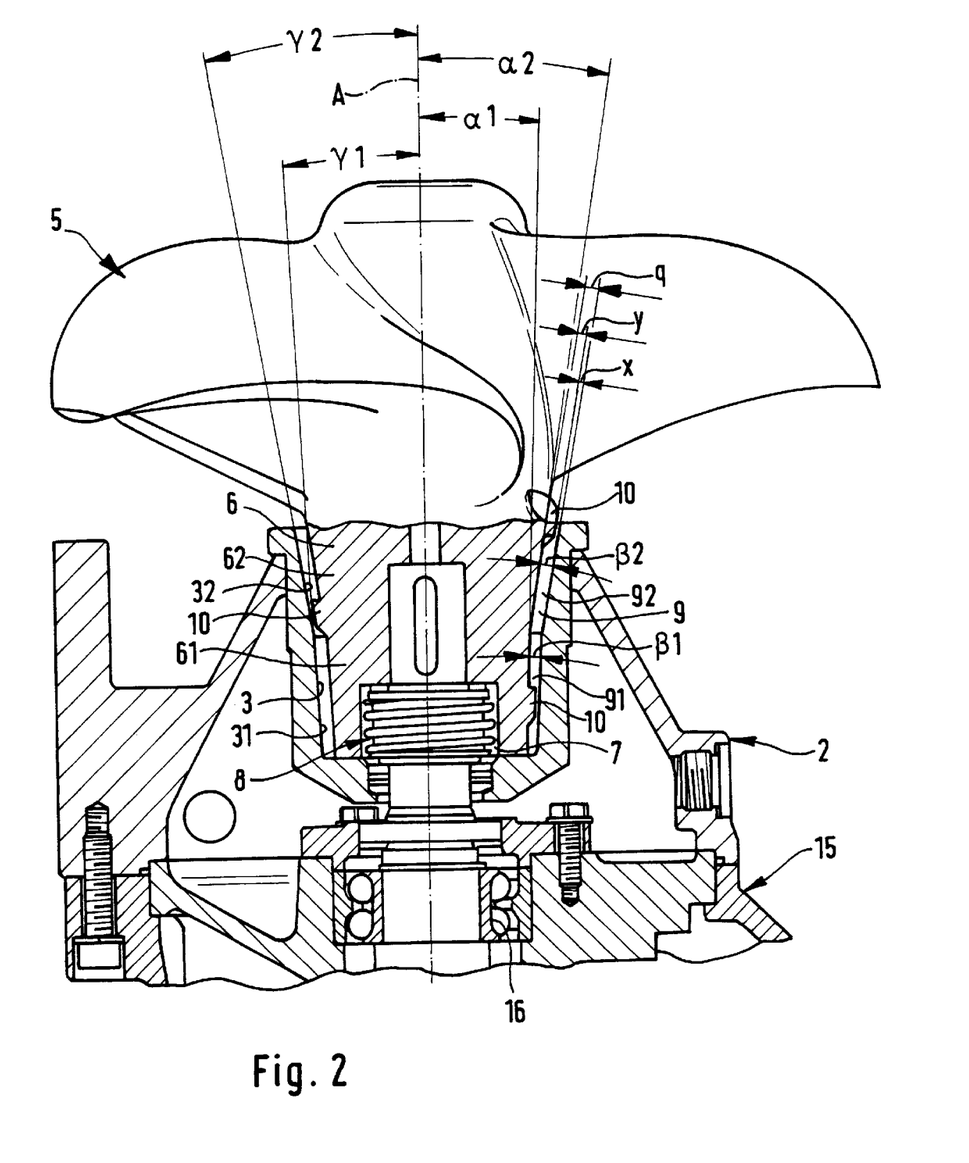
FIG. 2 is a sectional view corresponding to FIG. 1 of an agitator with a larger propeller.

Reference will now be made to FIG. 2 showing an embodiment of the invention in the form of an agitator with a larger propeller. The agitator in FIG. 2 is of generally the same design configuration as the embodiment of FIG. 1, but here the propeller 5 is of larger dimensions and is of a different shape in regard to the size and form of the propeller blades and in regard to the diameter and configuration of the hub 6.

Looking therefore at FIG. 2, the hub 6 has two portions of different conicities, which are arranged axially one behind the other. The cone angle α between the center line A and the outside wall of the hub 6 is therefore of different magnitude in those two portions, more specifically in the portion indicated at 61 which is remote from the blades of the propeller 5 the angle as indicated at α2 is 2° while in the adjoining portion 62 which is near the propeller blades the angle as indicated at α2 is 9°. The pot-shaped opening 3 in the housing is of a corresponding configuration. It has a portion 31 which is towards the bottom thereof and which is of smaller conicity than the portion 32 towards the exit end of the opening 3. The cone angle γ1 of the portion 31 in the embodiment of FIG. 2 is 3°. The cone angle γ2 of the axially adjoining portion 32 which extends as far as the exit end of the pot-shaped opening 3 is 10° in the illustrated structure. This means that the annular gap between the outside wall of the hub 6 and the inside wall of the opening 3 also has two axially successively arranged portions 91, 92. They each increase towards the propeller blades, more specifically the portion 91 of the annular gap 9 at an angle β1 and the portion 92 at angle β2. In the illustrated structure the angles β1 and β2 are the same and are 1°. The radial height y of the spiral portion 10 is 4 mm in the region of the exit end of the annular gap 9. In a corresponding manner to the embodiment of FIG. 1, the radial height y increases from the end remote from the propeller blades, to the end in the proximity thereof. That increase in the radial height y is such that the radial width x of the gap between the outside of the spiral portion 10 and the inside wall of the opening 3 is constant over the entire axial extent of the annular gap 9. In the embodiment in FIG. 2 that spacing x is constant at 1 mm.

In modified embodiments which involve a structural configuration which in principle is the same as the embodiment of FIG. 2, the cone angles α1 and α2 of the hub 6 and the cone angles γ1 and γ2 of the opening 3 can be of different values. The cone angle α1 in these embodiments is preferably between 0.5° and 10° and the cone angle α2 is larger in each case, more specifically being of a value of up to 15°. The cone angle γ1 of the opening 3 is preferably in a range of between 1° and 13° and the cone angle γ2 is correspondingly larger, preferably in a range of up to 18°. In these modified embodiments the radial width q of the annular gap 9 can preferably be between 2.2 mm and 13 mm. The radial height y of the spiral portion 10 can preferably be in the range of between 2 mm and 10 mm and more particularly preferably also can increase towards the propeller blades. The spacing x between the outside of the spiral portion 10 and the inside wall of the opening 3 is also preferably constant in these modified embodiments. That constant spacing as indicated at x is preferably between 0.2 mm and 3 mm.

In modified embodiments the outside wall of the hub 6 may also not be conical or tapered, in other words, it may be for example of a cylindrical configuration. Unlike the embodiments of FIGS. 1 and 2 in which the inside wall of the opening 3 or the two axial portions 31, 32 of the opening 3 of the housing is in the form of a wall without any raised portions or recesses therein, it can also be provided that a spiral configuration or recess is also formed on the inside surface of the pot-shaped opening 3. Alternatively or additionally to the spiral raised portions on the outside wall of the hub or on the inside wall of the pot-shaped opening 3, corresponding grooves may also be formed in the respective wall in question, to constitute the spiral configurations in each case.

Figure 3:
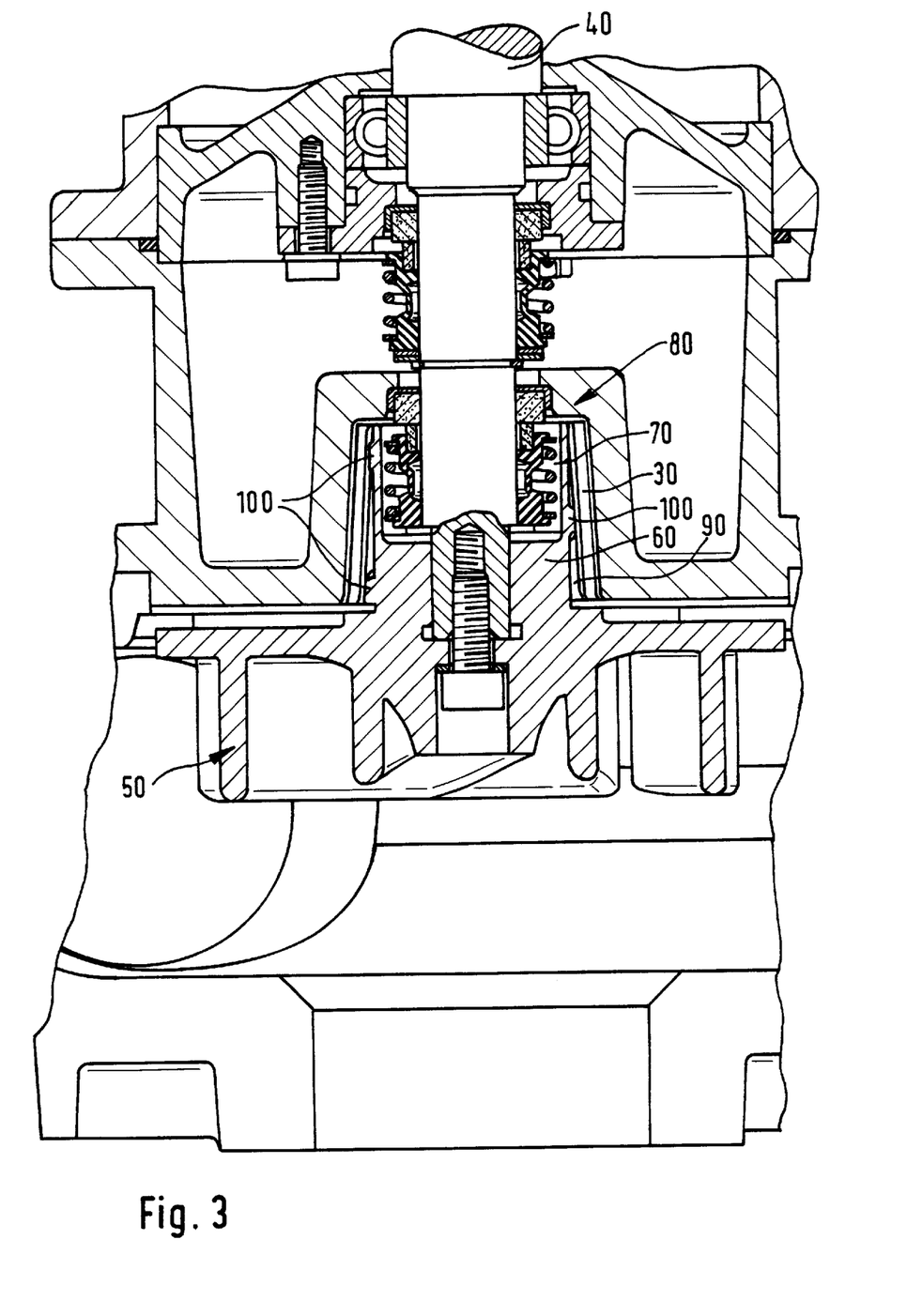
FIG. 3 is a sectional view of a pump in the region of the impeller and the sealing housing thereof.

Referring to FIG. 3, this involves a pump and more particularly an immersion pump which is therefore also arranged under water in operation. It has a motor-driven shaft 40 with an impeller 50 with a hub 60 arranged non-rotatably on the free end of the shaft 40. The shaft 40 is supported in the housing 10 of the pump, extending through a pot-shaped opening 30 in a sealing housing, in a corresponding manner to the embodiment shown in FIG. 1. In addition, a conically enlarging annular gap 90 is formed between the inside wall of the pot-shaped opening 30 in the housing and the outside of the hub 60. A raised portion 100 is also formed on the outside of the hub 60, extending in a spiral configuration along the hub. This embodiment also provides that the conicity of the inside wall of the pot-shaped opening 30 in the housing is greater than the conicity of the hub 60 and the radial height of the spiral raised portion 100 also increases during its spiral configuration from the end of the hub towards the underside of the impeller 50, and is therefore of the same conicity as the inside wall of the opening 30 in the housing, so that the region of the gap between the radial outside of the raised portion 10 and the inside wall of the pot-shaped opening 30 remains constant, although the remainder of the internal cross-section of the annular gap increases towards the exit end, that is to say in a direction towards the impeller 50.

When the shaft 40 with the impeller 50 mounted thereon by means of its hub 60 rotates, the spiral configuration 100 at the outside periphery of the hub 60 causes a fluid medium flow in the annular gap 90, which is directed away from the seal 60 and which passes out of the annular gap 90, thereby counteracting any deposit of particles in the fluid medium in the region of the seal 80.

The pot-shaped opening 30 in the housing can be provided with grooves at the housing side, which extend in the conveying direction and which assist with conveying foreign bodies out of the annular gap, insofar as they prevent them from also rotating with the hub. Those grooves are preferably directed axially, that is to say in parallel relationship with the hub 60 of the impeller 50. It is possible to provide a plurality of such grooves, preferably being distributed uniformly over the periphery of the hub, that is to say with four grooves each displaced through 900 relative to each other. It is however also possible to provide only one such groove, extending axially or in a spiral configuration.

There may also be modified embodiments of the invention involving pumps in which the pump assembly involved in the pump structure is an agitator mechanism, for example of the structure shown in FIG. 1 or FIG. 2. These involve what are referred to as recirculating pumps. In that case, the agitator mechanism used is so arranged that the propeller 5 is disposed in a pump housing, into the interior of which the propeller 5 projects. The interior of the pump housing is filled by the pump medium, while the feed line opens into the interior of the pump on one side and the pressure discharge line communicates with the interior of the pump on the other side. When the propeller 5 is rotated, a pump action is produced whereby the pump medium is conveyed out of the intake feed line into the pressure discharge line. The output of a recirculating pump designed in that way differs from a pump with an impeller, as shown for example in FIG. 3, insofar as it affords a relatively low delivery head, but can convey relatively high flow rates by volume. Recirculating pumps with propeller which are designed in that way preferably involve immersion pumps which are therefore used in basically the same arrangement as the immersion pump shown in FIG. 3.

Although in the above-described embodiments the spiral arrangement 10, 100 is formed in one piece with the respective wheel hub 6 or 60, it may be noted that the spiral arrangement may alternatively be in the form of a separate body arranged on or in the region of the wheel hub 6, 60, for example in the form of part of a cast wheel hub, or in the form of a separately fitted part comprising a wear-resistant material.

Also, by way of indication of the sizes involved, the radial height y of the raised portion 10, 100 can be in the size range of between 2 mm and 10 mm, more particularly around 3 mm, preferably with a wheel hub diameter of between 30 and 50 mm, or around 4 mm, preferably with a wheel hub diameter of between 50 and 90 mm.

It will be appreciated that the above-described embodiments of the invention have been set forth solely by way of example and illustration of the principles of the invention and that various other modifications and alterations may be made therein without thereby departing form the spirit and scope of the invention.

What is claimed is:

1. A machine comprising
   a stationary housing,
   a shaft having a free end,
   means rotatably supporting the shaft in the housing,
   motor means operable to drive the shaft in rotation,
   a wheel having a hub carried on the shaft at the free end thereof for moving a fluid medium, wherein the housing has a substantially pot-shaped opening through which the shaft engages in a coaxial relationship and the wheel at the free end of the shaft is arranged outside the housing and the hub of the wheel engages into the pot-shaped opening in the housing, forming an annular gap between the inside wall of the pot-shaped opening in the housing and the outside wall of the hub, said annular gap having an exit end, a seal which for sealing off at least one of the shaft and the hub and the housing relative to the medium, and a spiral means which is arranged in the region of the hub non-rotatably therewith to produce a flow of medium which in the annular gap is directed out of same to prevent a deposit of particles, at least one of the outside diameter and the cross-section of the annular gap between the inside wall of the pot-shaped opening in the housing and the outside wall of the wheel hub being of a configuration which continuously to said exit end to provide an unrestricted flow path for discharge of particles at said exit end.

2. A machine as set forth in claim 1 wherein the spiral means extends at the outside of the wheel hub from the end of the wheel hub which is remote from the wheel to the underside of the wheel.

3. A machine as set forth in claim 2 wherein the spiral means extends over the entire axial length of the annular gap.

4. A machine as set forth in claim 2 wherein the spiral means is adapted to make a transition into the working surface of the wheel.

5. A machine as set forth in claim 1 wherein the spiral means extends at an outside of the wheel hub from the end of the wheel hub which is remote from the wheel into a position at an axial spacing from the underside of the wheel.

6. A machine as set forth in claim 5 wherein the spiral means extends over the entire axial length of the annular gap.

7. A machine as set forth in claim 5 wherein the spiral means is adapted to make a transition into the working surface of the wheel.

8. A machine as set forth in claim 1 wherein the spiral means is formed in one piece with the wheel hub.

9. A machine as set forth in claim 1 wherein the spiral means is in the form of a separate body arranged at least in the region of the wheel hub.

10. A machine as set forth in claim 1 wherein the spiral means is provided by at least one of a spirally extending groove and a spirally extending raised portion at the outer peripheral surface of the wheel hub.

11. A machine as set forth in claim 10 wherein the spiral means is in the form of spiral profiling of the outside wall of the wheel hub.

12. A machine as set forth in claim 10 wherein the radial height of the raised portion on a portion engaging into the pot-shaped opening in the housing is in a size range of between 2 mm and 10 mm, in particular around 3 mm, with a wheel hub diameter of between 30 and 50 mm, or around 4 mm, with a wheel hub diameter of between 50 and 90 mm.

13. A machine as set forth in claim 10 wherein the radial height of the spirally extending raised portion is of an increasing configuration towards the wheel.

14. A machine as set forth in claim 10 wherein the radial outside wall of the spirally extending raised portion is of a constant spacing relative to the inside wall of the opening in the housing, over the extent of the raised portion.

15. A machine as set forth in claim 14 wherein said spacing is between 0.2 and 3 mm, preferably being 0.5 mm, with a diameter of the wheel hub of 90 mm, or 1 mm, with a diameter of the wheel hub of 170 mm.

16. A machine as set forth in claim 1 wherein the outside wall of the wheel hub is of a cylindrical configuration.

17. A machine as set forth in claim 1 wherein the outside wall of the wheel hub is of a conical configuration.

18. A machine as set forth in claim 17 wherein a cone angle determining the conicity of the wheel hub is smaller than a cone angle determining the conicity of the opening in the housing.

19. A machine as set forth in claim 18 wherein the opening in the housing has a plurality of axially adjoining portions and a cone angle which determines the conicity of the opening in the housing is of different magnitudes on different axial portions of the opening in the housing, preferably in dependence on a cone angle which determines the conicity of the wheel hub.

20. A machine as set forth in claim 17 wherein the wheel hub has a plurality of axially adjoining portions and a cone angle determining the conicity of the wheel hub is of different magnitudes on different axial portions of the wheel hub.

21. A machine as set forth in claim 17 wherein a cone angle which determines the conicity of the wheel hub is between 0.5° and 10°, preferably being 1°, and in particular with a diameter of the wheel hub of between 30 and 50 mm.

22. A machine as set forth in claim 17 wherein a cone angle which determines the conicity of the opening in the housing is between 1° and 13°, preferably being 2°, in particular when the cross-sectional diameter of the opening in the housing is between 50 and 90 mm.

23. A machine as set forth in claim 1 wherein the inside wall of the opening in the housing is of a conical configuration.

24. A machine as set forth in claim 1 wherein the inside wall of the opening in the housing is of a cylindrical configuration.

25. A machine comprising
a stationary housing,
a shaft having a free end,
means rotatably supporting the shaft in the housing,
motor means operable to drive the shaft in rotation,
a wheel having a hub carried on the shaft at the free end thereof for moving a fluid medium,
wherein the housing has a substantially pot-shaped opening through which the shaft engages in a coaxial relationship and the wheel at the free end of the shaft is arranged outside the housing and the hub of the wheel engages into the pot-shaped opening in the housing, forming an annular gap between the inside wall of the pot-shaped opening in the housing and the outside wall of the hub, a seal which for sealing off at least one of the shaft and the hub and the housing relative to the medium, and a spiral means which is arranged in the region of the hub non-rotatably therewith to produce a flow of medium which in the annular gap is directed out of same to prevent a deposit of particles, wherein the wheel hub has a coaxial opening which is open at an end portion remote from the wheel and in which at least a part of the seal is arranged, wherein the seal has a first sliding ring which is fixed with respect to the housing and which has a sealing surface at the housing side and which is arranged in the region of a housing aperture through which the shaft passes, and wherein the seal has a second sliding ring which has a sealing surface at at least one of the shaft side and the hub side and which is non-rotatable with the shaft and which is arranged within the opening of the hub.

26. A machine as set forth in claim 25 wherein the second sliding ring is co-operable with an elastic sealing element, which has a sealing surface on at least one of the shaft side and the hub side and is arranged within the opening in the hub.

27. A machine as set forth in claim 26 wherein the elastic sealing element is in the form of an elastic bellows member such as a rubber bellows member having a first end supported at the second sliding ring and a second end supported at at least one of the hub and the shaft, preferably in the region of the inner end of the opening in the hub.

28. A machine as set forth in claim 26 including a spring urging the elastic sealing element into a sealing position.

29. A machine as set forth in claim 28 wherein the spring is in the form of a coil compression spring around the elastic sealing element.

30. A machine as set forth in claim 25 wherein the seal is in the form of a sliding ring seal.

31. A machine as set forth in claim 25 wherein at least one of the first sliding ring and the second sliding ring is made of ceramic material.

32. A machine as set forth in claim 31 wherein the ceramic material is silicon carbide.

33. A machine as set forth in claim 25 wherein the opening in the hub is in the form of a pot-shaped opening of substantially constant cross-section.

34. A machine as set forth in claim 25 wherein the opening in the hub extends from the end of the hub which is remote from the wheel, along at least approximately half of the axial length of the hub.

35. A machine as set forth in claim 25 wherein the opening in the hub extends from the end of the hub which is remote from the wheel, along at least approximately a third of the axial length of the hub.

36. A machine as set forth in claim 25 wherein the hub is adapted to engage substantially with its entire axial length into the opening in the housing.

37. A wheel having a wheel hub and blade portions, for engagement into a pot-shaped opening of a housing of a hydrodynamic machine, wherein the wheel hub is connected in one piece to the blade portions and has a spiral means on its outside wall, wherein said hub has a coaxial cylindrical opening.

38. A wheel comprising a wheel hub and blade portions, preferably for engagement into a pot-shaped opening of a housing of a hydrodynamic machine, wherein the spiral means extends at the outside of the wheel hub from a position on the end of the wheel hub which is remote from the blade portions to the underside of the blade portions, wherein said hub has a coaxial cylindrical opening to the underside of the blade portions.

39. A wheel as set forth in claim 38 wherein the spiral means is of a configuration forming a transition into the working surface of the blade portions.

40. A wheel as set forth in claim 38 wherein the spiral means extends at the outside of the wheel hub from a position on the wheel hub which is remote from the blade portions to a position on the wheel hub at an axial spacing from the underside of the blade portions.

41. A wheel as set forth in claim 38 wherein the spiral means extends at the outside of the wheel hub from an end of the wheel hub remote from the blade portions to a position on the wheel hub at an axial spacing from the underside of the blade portions.

42. A wheel as set forth in claim 38 wherein the spiral means is formed in one piece with the wheel hub.

43. A wheel as set forth in claim 38 wherein the spiral means is in the form of a separate body arranged at least in the region of the wheel hub.

44. A wheel as set forth in claim 43 wherein the spiral means is in the form of part of a cast wheel.

45. A wheel as set forth in claim 43 wherein the spiral means is in the form of a separately fitted part comprising a wear-resistant material.

46. A wheel as set forth in claim 38 wherein the spiral means is provided by at least one of a spirally extending groove and a spirally extending raised portion at the outer peripheral surface of the wheel hub, preferably in the form of spiral profiling of the outside wall of the wheel hub.

47. A wheel as set forth in claim 46 wherein the radial height of the raised portion is in a size range of between 2 mm and 10 mm, in particular around 3 mm, with a wheel hub diameter of between 30 and 50 mm, and around 4 mm, with a wheel hub diameter of between 50 and 90 mm.

48. A wheel as set forth in claim 46 wherein the radial height of the spirally extending raised portion is of an increasing configuration towards the propeller blade portions.

49. A wheel as set forth in claim 38 wherein the outside wall of the wheel hub is cylindrical.

50. A wheel as set forth in claim 38 wherein the outside wall of the wheel hub is conical.

51. A wheel as set forth in claim 50 wherein the wheel hub has a plurality of axial portions and a cone angle determining the conicity of the wheel hub is of different magnitudes on different axial portions of the wheel hub.

52. A wheel as set forth in claim 50 wherein a cone angle which determines the conicity of the wheel hub is between 0.5° and 10°, preferably being 1°.

53. A wheel as set forth in claim 38
wherein at an end remote from the blade portions the wheel hub has an outwardly open coaxial opening.

54. A wheel as set forth in claim 53
wherein the coaxial opening is in the form of a stepped opening with a coaxial inner portion for non-rotatably receiving a shaft and a coaxial outer portion of larger diameter for receiving a sealing means.

55. A wheel as set forth in claim 38
wherein the wheel hub has a thickening of the outside diameter of the hub in the region in which the blade portions are arranged.

56. A wheel as set forth in claim 55
wherein the thickening of the wheel hub is in the form of a thickened axial portion of the wheel hub which is substantially spherical.

57. A wheel as set forth in claim 55
wherein the thickening of the wheel hub is in the form of a thickened axial portion of the wheel hub which is substantially cylindrical.

58. A wheel as set forth in claim 55 including
a transitional region between the thickening of the wheel hub and an adjoining axial portion of the wheel hub.

59. A wheel as set forth in claim 58
wherein the transitional region is of a bevelled configuration.

60. A wheel as set forth in claim 58
wherein the transitional region is of a rounded configuration.

61. A wheel as set forth in claim 58
wherein the transitional region is of a stepped configuration.

62. A wheel as set forth in claim 55
wherein the wheel hub is of its largest outside diameter in the region of the thickening.

* * * * *